(12) United States Patent
Mosdal

(10) Patent No.: US 6,367,562 B1
(45) Date of Patent: Apr. 9, 2002

(54) BUMP STOP TUBE FOR A FOLDING IMPLEMENT

(75) Inventor: Brian Thomas Mosdal, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/648,469

(22) Filed: Aug. 23, 2000

(51) Int. Cl.$^7$ ................................................ A01B 73/00
(52) U.S. Cl. ..................................... 172/311; 172/776
(58) Field of Search ................................. 172/310, 311, 172/776, 662, 452, 456, 457, 466, 481, 494; 56/228, 385

(56) References Cited

U.S. PATENT DOCUMENTS

| | | | | |
|---|---|---|---|---|
| 3,887,016 A | * | 6/1975 | Hansen ........................ | 172/311 |
| 4,320,805 A | | 3/1982 | Winter ........................ | 172/776 |
| 4,355,690 A | * | 10/1982 | Jensen et al. ................ | 172/311 |
| 4,415,043 A | * | 11/1983 | Hadler et al. ................ | 172/776 |
| 4,867,245 A | | 9/1989 | Stevens ........................ | 172/311 |
| 4,974,684 A | * | 12/1990 | Stevens ........................ | 172/311 |
| 5,178,328 A | * | 1/1993 | Broyhill ..................... | 239/168 |
| 6,119,792 A | * | 9/2000 | Almer ......................... | 172/799.5 |

* cited by examiner

Primary Examiner—Robert E. Pezzuto

(57) ABSTRACT

A multi-section implement frame with outer wing sections which fold relative to an inner section includes a bump stop tube assembly having a simple tube with faces slotted at one end to receive the bight portion of a U-bolt. The legs of the U-bolt are threaded and extend around the faces of an inner frame section tube, and a two-hole strap is positioned over the ends secured against the bottom of the frame section tube by two nuts. A tapered stop includes a connecting portion received within the projecting contact end of the tube to eliminate a welding step during manufacture. The slotted end of the tube is coped to generally conform to the shape of the frame section tube. The assembly is very simple and inexpensive and can be slid easily on the frame section tube to avoid standards, wheel modules or various other obstructions mounted on the frame.

12 Claims, 2 Drawing Sheets

BUMP STOP TUBE FOR A FOLDING IMPLEMENT

BACKGROUND OF THE INVENTION

1) Field of the Invention

The present invention relates generally to agricultural implements and, more specifically, to folding framed implements with wing sections which fold to a position closely adjacent to another section of the frame.

2) Related Art

Folding implement frames are widely used for agricultural applications to provide a wide field-working width and a narrower transport width. Some implements have tool-carrying frames with five sections or more, including outermost wing sections that fold over corresponding inner wing sections for transport. The inner wing sections are hinged to a main frame section so that the folded inner wing/outer wing combination on each side of the implement can be folded to an upright transport position. In the transport position, tools and lift wheel assemblies on the opposite outermost wing sections are in close proximity to each other over the central portion of the main frame. To help space the adjacent sections and prevent excessive shock loads on the folding cylinders and other portions of the folding hinge structure during transport, a bump stop tube is commonly positioned between the sections. A typical bump stop tube assembly used to carry the load of the outer section is a weldment including a tube, a mounting plate, a curved bump plate or contact member welded to the tube for abutting the outer section, and attaching hardware for securing the lower end of the tube to the adjacent inner section. The weldment is relatively expensive and can interfere with mounting hardware for tools in some desired tool-mounting configurations for the implement.

BRIEF DESCRIPTION OF THE INVENTION

It is therefore an object of the present invention to provide an improved bump stop tube assembly for a folding implement. It is another object to provide such an assembly which overcomes the aforementioned problems.

It is a further object of the invention to provide an improved bump stop tube assembly for a multi-sectioned implement which is relatively simple and inexpensive compared to at least most previously available bump stop arrangements. It is another object to provide such an assembly which is more compact than at least most previously available bump stop arrangements to provide increased clearance for more mounting hardware adjacent the assembly. It is still another object to provide such a bump stop assembly which can be easily positioned on the implement frame to avoid standards, wheel modules or other obstructions.

It is a further object of the invention to provide an improved bump stop tube assembly which does not require welding for manufacture. It is a further object to provide such an assembly with an improved contact member.

Accordingly, a bump stop tube assembly for a multi-sectioned implement frame such as a field cultivator or chisel plow frame having inner and outer frame sections which fold relative to each other for transport includes a simple tube with faces slotted at one end to receive the bight portion of a U-bolt. The legs of the U-bolt extend around the faces of an inner frame section tube, and a two-hole strap is positioned over the threaded ends of the U-bolt legs and secured against the bottom of the frame section tube by two nuts. A special contact member includes a connecting portion secured within the open end of the tube opposite the slotted end and replaces the curved piece of steel that previously was welded to the tube so that manufacturing costs and fabrication time are reduced and appearance is improved. The contact member is also tapered to reduce interference. The mounting end of the bump stop tube is coped to better conform to the frame section tube and to facilitate use of the same bump stop tube on smaller section tubes.

The assembly is very simple and inexpensive and does not require any welding steps for manufacture. The assembly can be slid easily on the frame section tube to avoid standards, wheel modules or various other obstructions mounted on the frame.

These and other objects, features and advantages of the present invention will become apparent to one skilled in the art upon reading the following detailed description in view of the drawings.

DESCRIPTION OF THE DRAWINGS

Figure 1:
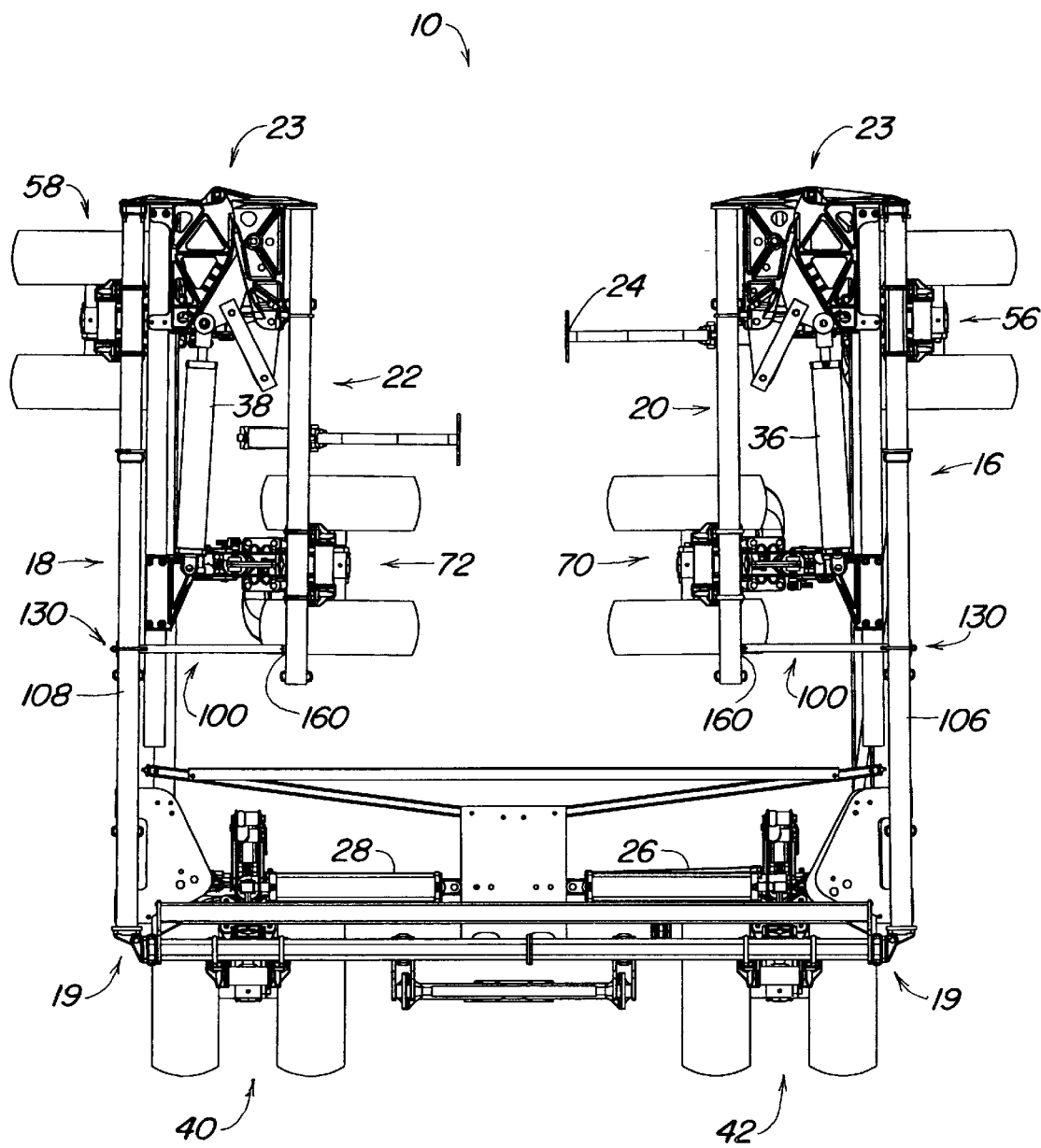
FIG. 1 is a rear view of a five-section implement with the frame in the fully folded transport position and including a bump stop tube assembly.

Referring now to FIG. 1, therein is shown an implement frame 10 for a field cultivator or chisel plow or other multi-section folding implement. The frame 10 includes a main or center frame 12, inner wing frames or sections 16 and 18 pivotally connected inner ends to opposite sides of the center frame 12 by hinge structures 19, and outer wing frames or sections 20 and 22 pivotally connected to the outer ends of the sections 16 and 18, respectively by hinge structures 23. The frames support a plurality of earthworking tools 24. Inner wing fold cylinders 26 and 28 are connected between the center frame 12 and the inner wing sections 16 and 18. The cylinders 26 and 28 are connected to a conventional control valve on the towing vehicle (not shown) for selectively extending and retracting the cylinders and pivoting the sections 16 and 18 between an unfolded field-working position and a folded transport position (shown). Outer wing fold cylinders 36 and 38 are connected between the respective inner wing sections 16 and 18 and the outer wing sections 20 and 22 to pivot the sections 20 and 22 between folded (shown) and unfolded positions. The outer wing fold cylinders 36 and 38 are also connected to a control valve on the tractor for extension and retraction. The hydraulic system assures that the outer wing sections 20 and 22 fold over the inner wing sections 16 and 18 prior to the inner wing sections pivoting upwardly into the transport position. During unfolding, the inner wing sections 16 and 18 pivot downwardly to their field-working positions prior to the outer wing sections 20 and 22 unfolding from their transport positions generally parallel to the frames 16 and 18.

Vertically adjustable lift wheel assemblies 40 and 42 support the center frame 12 above the ground. Vertically adjustable lift wheel assemblies 56 and 58 support the inner wing frames 16 and 18 in the field-working position. The outer wing frames 20 and 22 are supported in the field-working position by vertically adjustable lift wheel assemblies 70 and 72.

To help space and support the outer wing frames 20 and 22 in the folded positions and to prevent excessive shock loads from being transferred to the hinge structures 23 and the fold cylinders 36 and 38, simple adjustable bump stop tube assemblies 100 are supported from locations on transversely extending tubular frame members 106 and 108 of the inner wing frames 16 and 18 and contact upper surfaces on corresponding tube members on the outer wing frames 20 and 22 when the outer wing frames are folded (FIG. 1). Each assembly 100 includes a hollow bump stop tube 110 of generally rectangular cross section having a hollow interior, an open first or connecting end 112 and an open second or contact end 114. The tube 110 includes opposite sides 116 and 118 of preselected depth, both of which are slotted adjacent the first end 112, as shown generally at 120 of FIG. 1. The sides 116 and 118 are joined by opposite walls 122 and 124 of preselected width generally greater than the preselected depth.

The first end 112 of each tube 110 is coped to conform generally to the shape of the corresponding tube members 106 and 108, with the sides 116 and 118 terminating slightly below the lower edges of the walls 122 and 124. A bolt assembly shown generally at 130 secures the coped end 112 tightly against the upper surface of corresponding tube member 106 or 108 at the desired location along the inner wing section so the contact end 114 projects into the path of the upper surface of the corresponding outer wing section out of interfering relationship with components on the sections. The bolt assembly 130 may be loosened so the assembly 100 can be repositioned easily along the inner section or frame. As shown, the bump stop tube assemblies 100 present a relatively narrow profile (FIG. 1) when viewed in the forward direction, and the bracket or bolt assembly 130 connecting is substantially maintained within the planes of the walls 122 and 124 so that interference on the implement frame is minimized.

Figure 2:
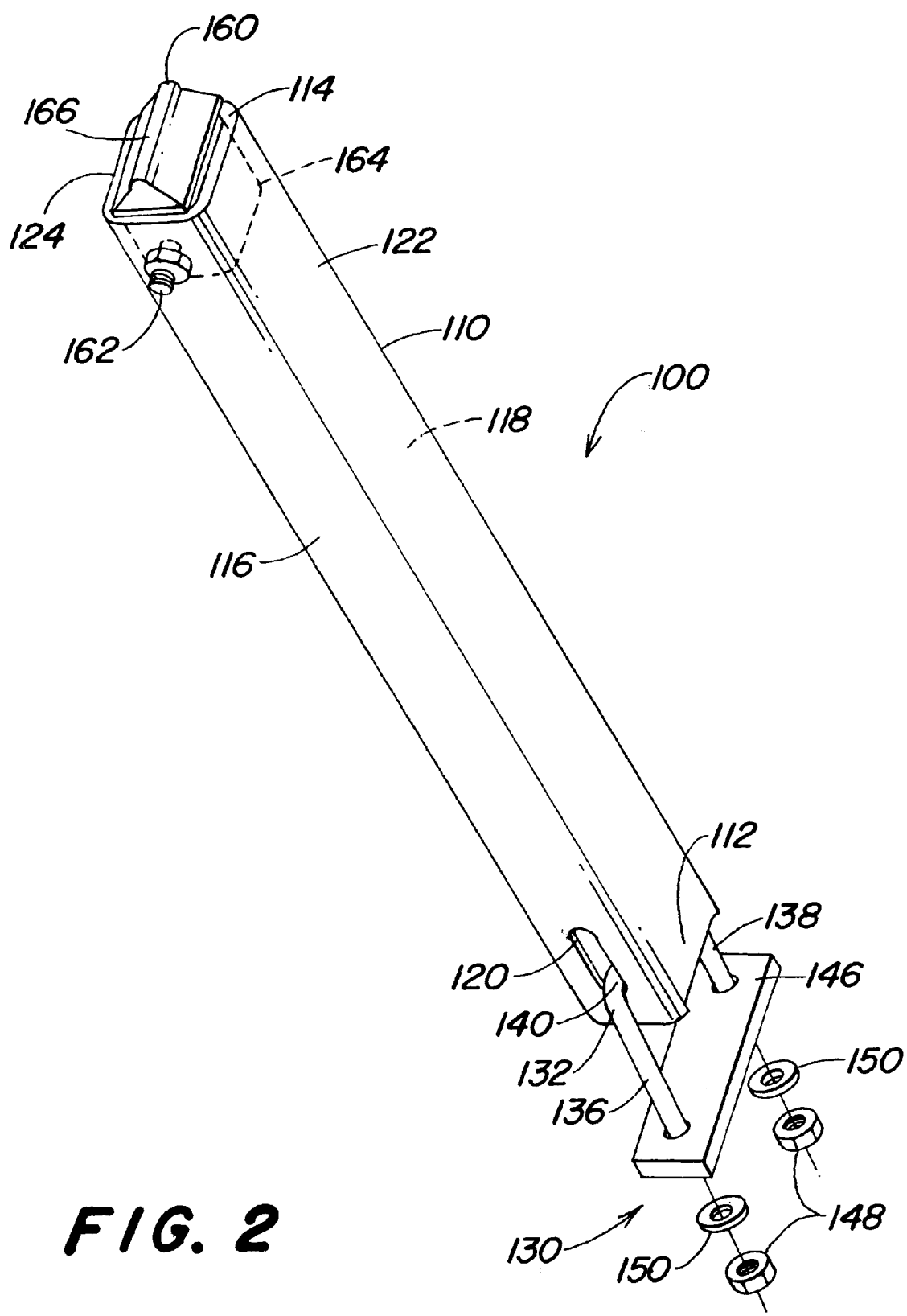
FIG. 2 is a perspective view of the bump stop tube used with the implement of FIG. 1.

The bolt assembly 130 as shown in FIG. 2 includes a U-bolt 132 having sidelegs 136 and 138 joined by a bight portion 140 which is received within the slots 120. An apertured plate or bracket 146 is received over the ends of the U-bolt sidelegs 136 and 138 which are threaded to receive securing nuts 148 and washers 150. Flanged locking nuts can also be used in place of the nut/washer combination. The slots 120 are of sufficient length to permit insertion of the U-bolt therein.

The sidelegs 136 and 138 of the U-bolts 132 are positioned adjacent the fore and aft faces of the tubular frame members 106 and 108, and the plates 146 are inserted on the sidelegs 136 and 138 and tightened against the bottom of the members with the nuts 148. The coped lower ends of the tubes 110 are firmly held against the tops of the member 106 and 108 with the contact ends 114 projecting away from the corresponding frame. The coped ends 112 not only help to securely position the tubes 110 on similarly sized tubular frame members but also permit the same tubes 110 to be utilized on smaller dimensioned frame members to thereby reduce the number of additional parts necessary for different implement frames.

A contact member or stop 160 is inserted in the contact end 114 of the tube 110 and is supported with a portion projecting from the end 114 by a bolt 162 extending through apertures in the opposite sides 116 and 118 of the end 114 and through a bore in the stop 160. Preferably, the stop 160 is cast iron and tapers from a base portion 164 adjacent the edge of the end 114 to a narrowed contact area 166. The tapered section of the cast iron stop 130 allows components such as standards and the like to be mounted even closer to the centerline of the bump stop without interference.

Having described the preferred embodiment, it will become apparent that various modifications can be made without departing from the scope of the invention as defined in the accompanying claims. For example, although a five-section implement with flat fold outer sections is shown, it is to be understood that the assembly 100 may be utilized with implements having a different number of sections and having different folding configurations. In addition, although the stop assembly 100 is shown and described as being supported from an inner frame and projecting towards an outer frame when the implement in folded, the stop assembly could also be mounted on the outer frame to project towards the inner frame.

What is claimed is:

1. A folding agricultural implement having a frame portion including a tubular frame member having faces joined by top and bottom walls, and a wing section pivotally supported from an outer end of an inner frame portion for movement between an outwardly extending field-working position and a folded transport position adjacent to the inner frame portion, a stop assembly for spacing the wing section relative to the inner frame portion and absorbing shock loads from the wing section, the stop assembly comprising:
    a tube of generally rectangular cross section having a hollow interior, an open first end and an opposed second end, the first end including sides with apertures;
    a bolt assembly with spaced sidelegs having threaded proximate ends and distal ends received by the apertures; and
    a bracket member received on the proximate ends and nut members threaded on the proximate ends securing the bracket member against the bottom wall of the tubular frame member and the first end against the top wall with the opposed second end projecting upwardly from the frame member.

2. The stop assembly as set forth in claim 1 wherein the bracket member may be loosened to facilitate sliding of the stop assembly along the tubular frame.

3. The stop assembly as set forth in claim 1 wherein the first end is coped to conform to the tubular frame.

4. The stop assembly as set forth in claim 1 wherein the second end is open and a contact member is received in the open second end, and a non-welded securing member maintaining the contact member in the second end.

5. The stop assembly as set forth in claim 4 wherein the contact member narrows in an outward direction so that interference with components on wing section are minimized.

6. The stop assembly as set forth in claim 1 wherein the bolt assembly comprises a U-bolt with a bight portion connecting the sidelegs, and wherein the apertures in the first end are elongated to receive the U-bolt with the bight portion extending between opposite sides of the tube.

7. A folding agricultural implement having a frame including a tubular frame member having faces joined by top wall and a bottom wall, the frame including a wing section and a frame portion pivotally connected to each other for relative movement along a path between an outwardly extending field-working position and a folded transport position wherein the frame portion approaches a generally parallel relationship with the wing section, a stop assembly for spacing the wing section relative to the frame portion and absorbing shock loads from the wing section, the stop assembly comprising:
    a tube of generally rectangular cross section having opposed planar walls, an open connecting end and an opposed projecting end, the connecting end including apertures;
    a non-welded bracket assembly received by the apertures and securing the connecting end against the top wall with the opposed projecting end extending from the top wall into the path; and wherein the bracket assembly lies generally within the plane of the opposed planar walls to thereby minimize interference on the frame.

8. The stop assembly as set forth in claim 7 wherein both the connecting end and the bracket assembly are free of welded connections.

9. The stop assembly as set forth in claim 7 wherein the projecting end is open and including an insert positioned partially within the projecting end of the tube and defining a stop member.

10. The stop assembly as set forth in claim 9 wherein the insert is tapered to a narrowed outermost end to minimize interference with components on the frame.

11. The stop assembly as set forth in claim 9 wherein the insert includes an apertured portion inserted into the projecting end of the tube and secured therein by a bolt extending through the apertured portion and the tube.

12. The stop assembly as set forth in claim 7 wherein the connecting end is coped to conform generally to the shape of the top wall.

* * * * *